March 28, 1939. P. ONORATO ET AL 2,152,083
POULTRY BLEEDING AND STEAMING MACHINE
Filed Sept. 3, 1935   6 Sheets-Sheet 1

INVENTORS.
Paul Onorato
Emile Weinaug
BY Chas. E. Townsend
ATTORNEY

March 28, 1939.　　P. ONORATO ET AL　　2,152,083
POULTRY BLEEDING AND STEAMING MACHINE
Filed Sept. 3, 1935　　6 Sheets-Sheet 2

INVENTORS.
Paul Onorato
Emile Weinaug
BY
Chas. E. Townsend.
ATTORNEY

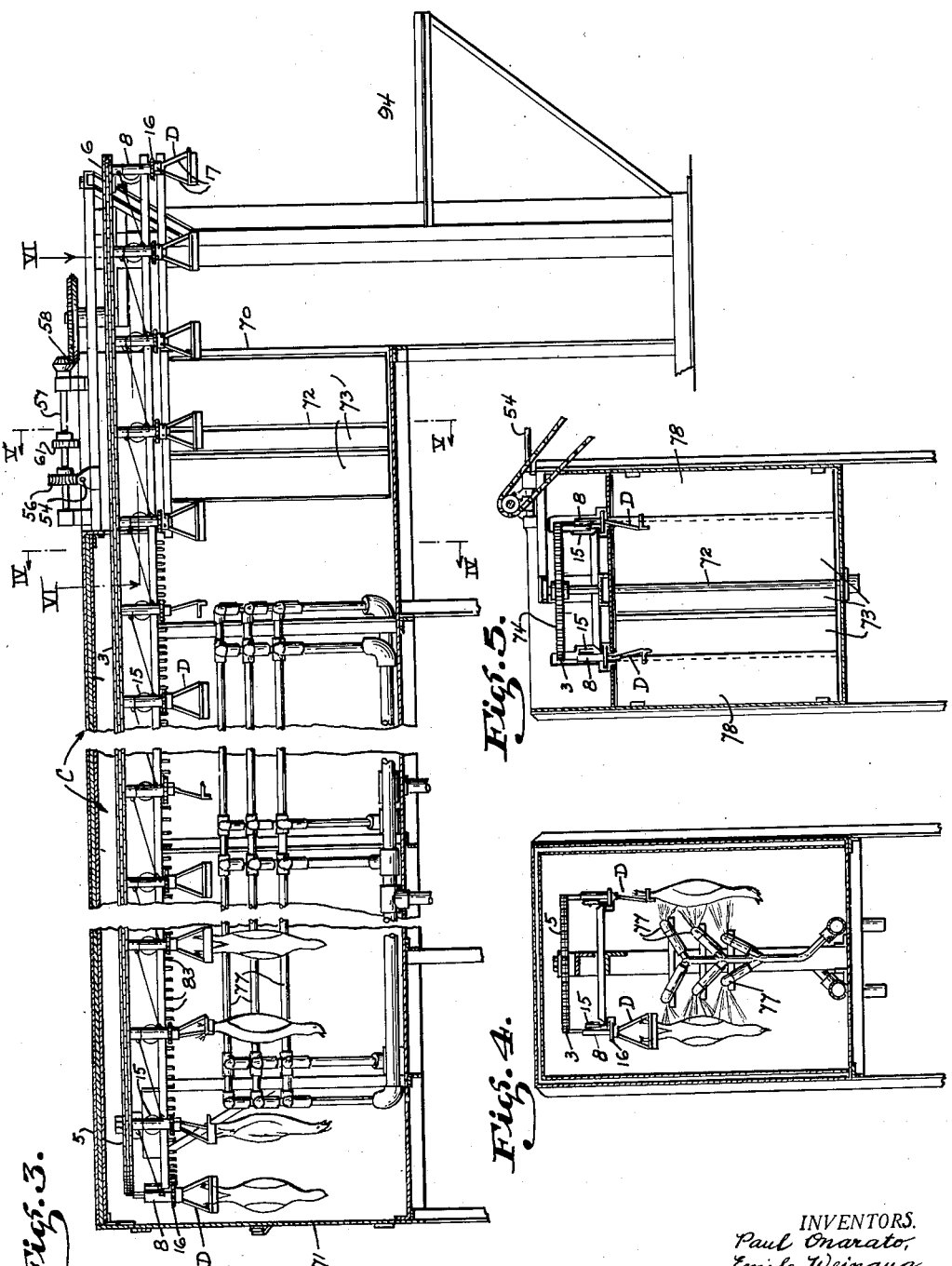

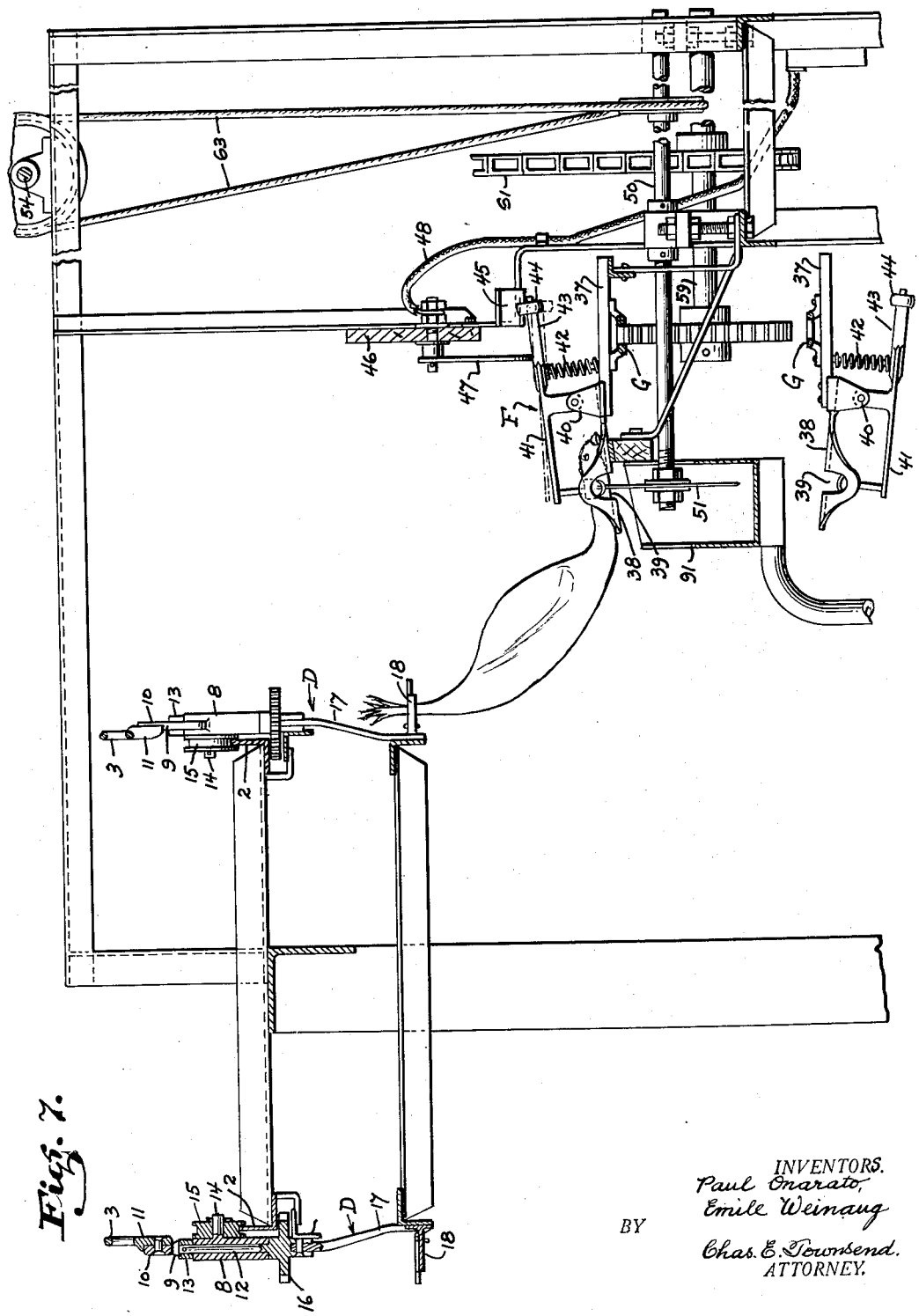

March 28, 1939. P. ONORATO ET AL 2,152,083
POULTRY BLEEDING AND STEAMING MACHINE
Filed Sept. 3, 1935  6 Sheets-Sheet 5
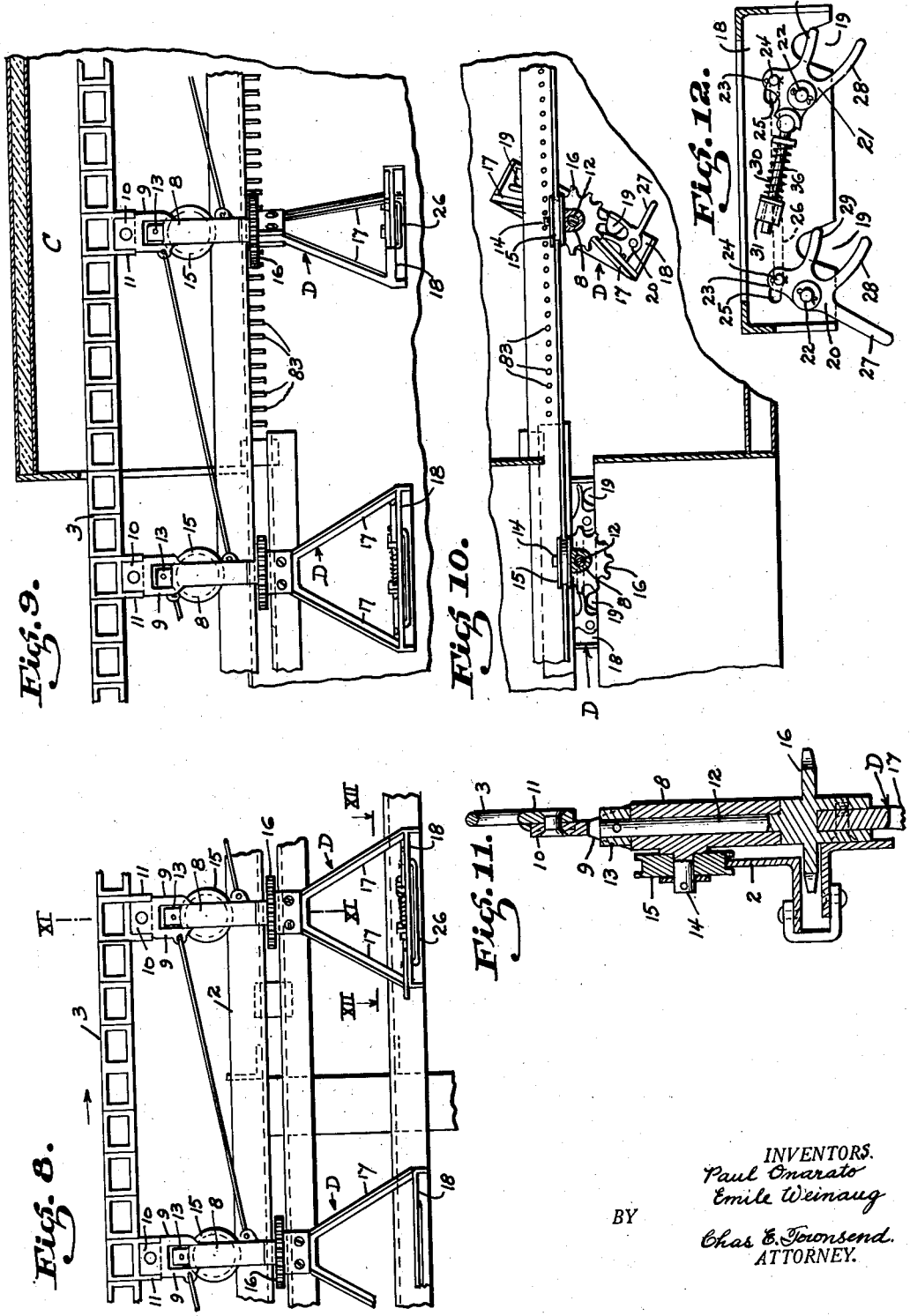
INVENTORS.
Paul Onorato
Emile Weinaug
BY Chas. E. Townsend.
ATTORNEY.

March 28, 1939. P. ONORATO ET AL 2,152,083
POULTRY BLEEDING AND STEAMING MACHINE
Filed Sept. 3, 1935   6 Sheets-Sheet 6
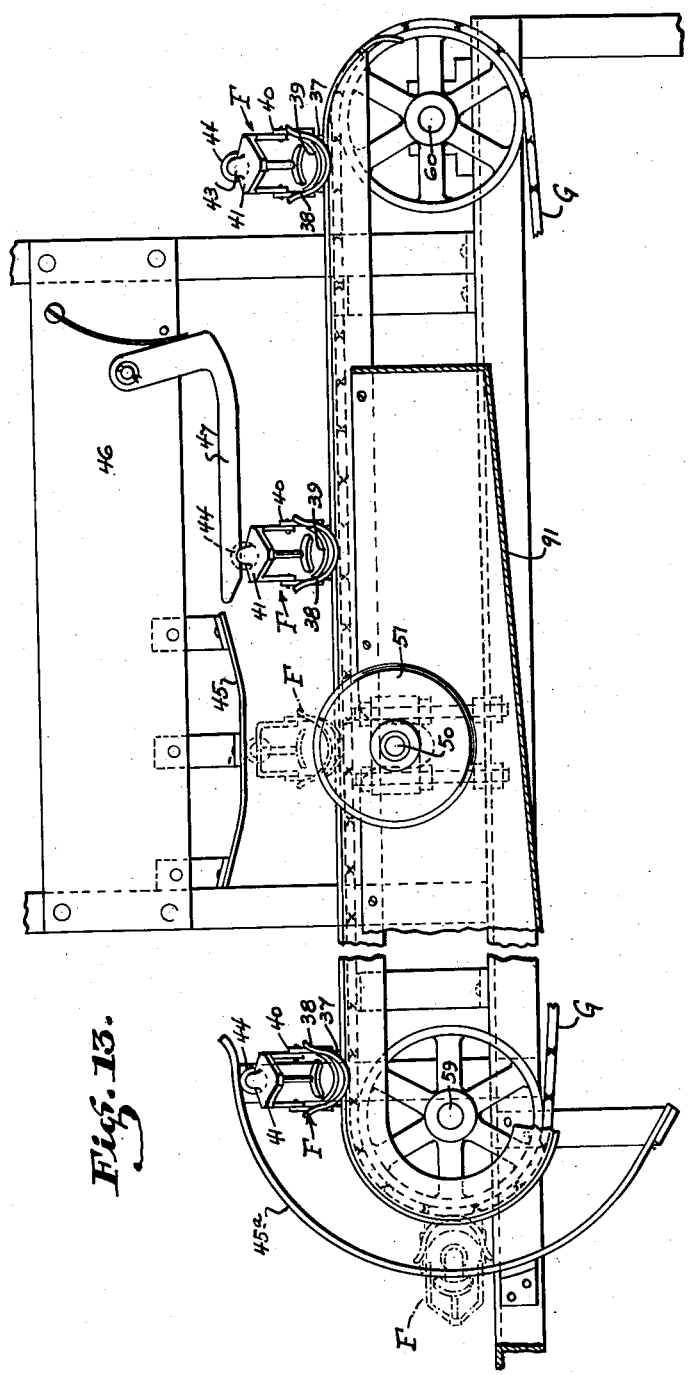
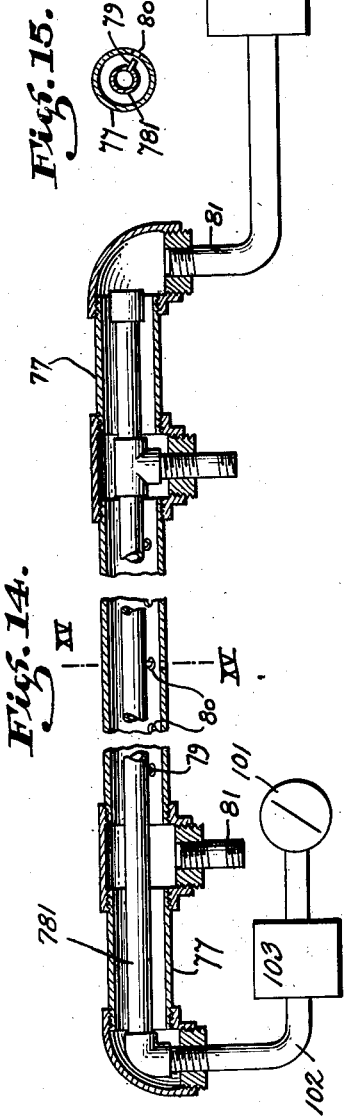
INVENTORS.
Paul Onorato.
Emile Weinaug.
BY Chas. E. Townsend.
ATTORNEY Patented Mar. 28, 1939

2,152,083

UNITED STATES PATENT OFFICE 2,152,083

POULTRY BLEEDING AND STEAMING MACHINE

Paul Onorato, San Mateo, and Emile Weinaug, San Francisco, Calif.

Application September 3, 1935, Serial No. 38,918

6 Claims. (Cl. 17—11)

This invention relates to a machine for bleeding and steaming poultry prior to the picking or removal of the feathers and especially to improvements on the structure disclosed in our copending application entitled "Poultry bleeding and steaming machine" filed October 3, 1934, Serial Number 746,680.

The object of the present invention is generally to improve the construction and operation of machines of the character described, more specifically stated, to improve the structure disclosed in our copending application above referred to by providing an endless conveyor for receiving and securing the feet of the poultry whereby they will hang in a suspended condition while passing through the several stages of operation; by providing a simple clamping mechanism for securing the heads of the poultry during the stages of electric stunning, cutting and bleeding and in providing means for automatically releasing said clamping means when the operations specified have been performed; and, further, by providing means for revolving the poultry as they are passing between a series of nozzles in the steaming chamber, thereby rendering the feather follicles relaxed and softened to a degree which permits quick and clean plucking or removal of the feathers.

The machine is shown by way of illustration in the accompanying drawings, in which—

Fig. 3 is a side elevation showing the steaming chamber in section;

Fig. 4 is a vertical cross section on line IV—IV of Fig. 3;

Fig. 5 is a vertical cross section on line V—V of Fig. 3;

Fig. 6 is a horizontal section of the gate at one end of the steaming chamber through which the poultry is admitted and removed one by one; said section being taken on line VI—VI of Fig. 3.

Fig. 7 is an enlarged vertical cross section taken on line VII—VII of Fig. 1;

Fig. 8 is a large detail side elevation showing a portion of the conveyor, the carriers and the rails supporting them;

Fig. 9 is a view similar to Fig. 8, showing the pin rack whereby the carriers are rotated after admission to the steaming chamber;

Fig. 10 is a plan view of Fig. 9;

Fig. 11 is an enlarged vertical section taken on line XI—XI of Fig. 8;

Fig. 12 is an enlarged plan section taken on line XII—XII of Fig. 8;

Fig. 13 is an enlarged side elevation of the secondary conveyor whereby the heads of the poultry are clamped during the operations of electrically stunning, cutting and bleeding;

Fig. 14 is an enlarged sectional view of one of the pipes in the steaming chamber whereby heated air and steam is admitted to the nozzles; and Fig. 15 is a cross section on line XV—XV of Fig. 14.

Figure 1:
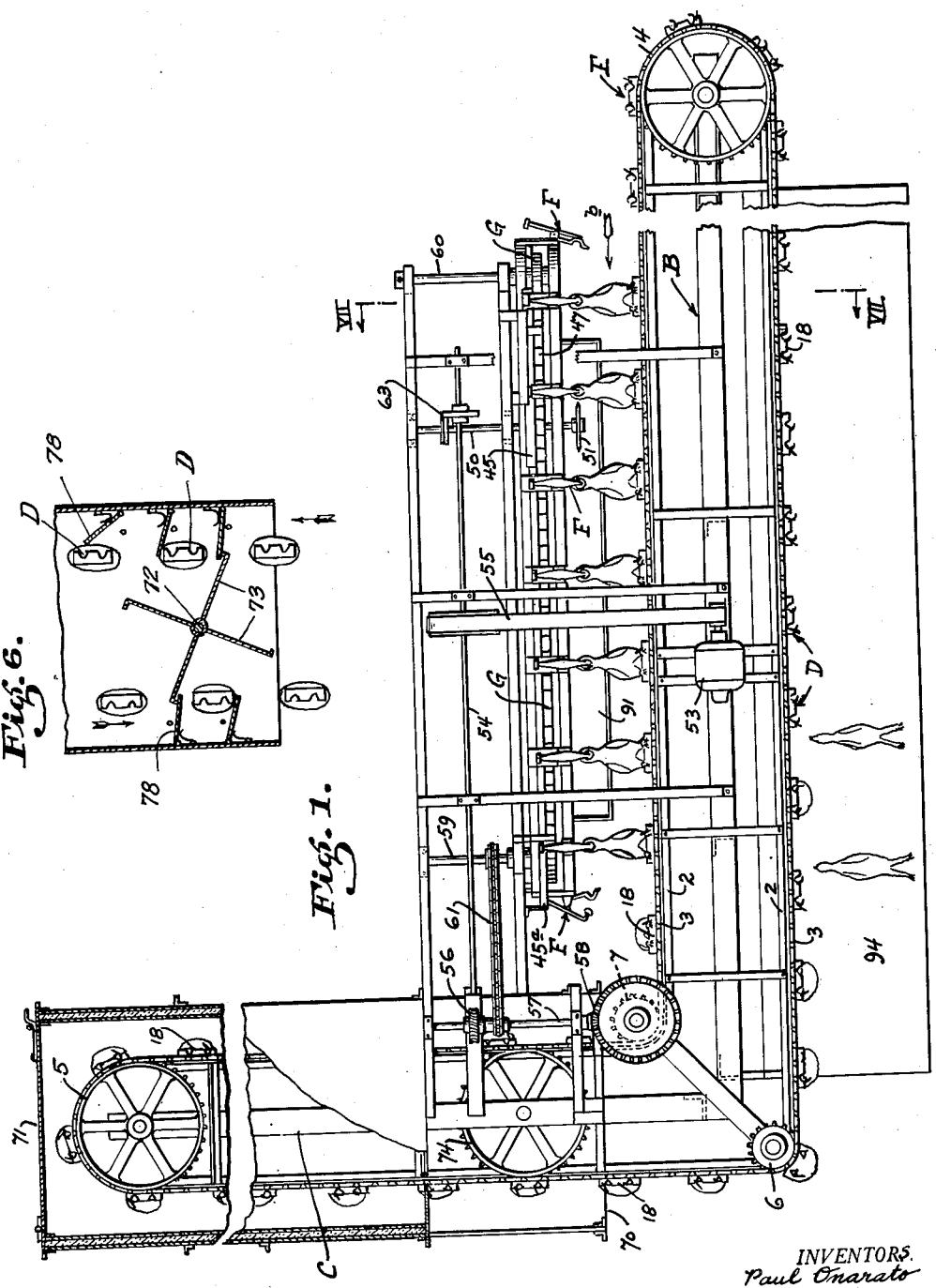
Fig. 1 is a plan view of the machine, a portion of said view being partially broken away to show the steaming chamber.
Figure 2:
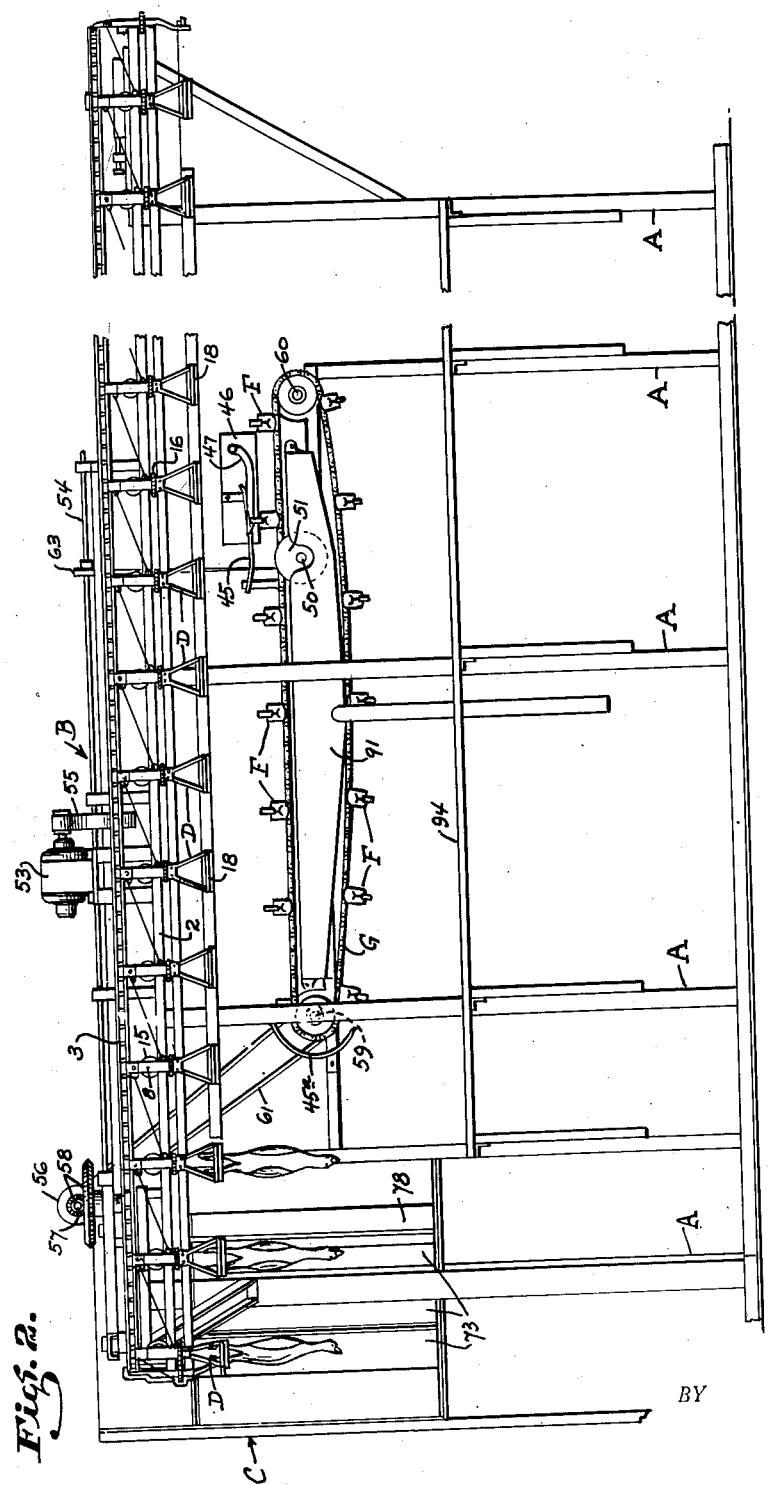
Fig. 2 is a front view of the machine.

Referring to the drawings in detail, and particularly Figs. 1 and 2, A indicates a plurality of vertically disposed standards forming the support for the main frame. Secured on the upper ends of the standards is a rail or track 2 and disposed upon the rail is a conveyor or chain 3. The main frame consists of two sections B and C, see Fig. 1, disposed at right angles with relation to each other. The conveyor chain is of the endless type and is carried by sprockets indicated at 4, 5, 6 and 7, sprockets 4, 5 and 6 being idlers and the sprocket 7 the driver. The poultry to be treated or processed are suspended from the chain and to prevent sagging of the chain between the sprockets the rail 2 is used. It is also endless and follows the same path of travel as the chain.

Secured to the chain at equally spaced intervals are a plurality of carriers D. These carriers are identical in construction and are best illustrated in Figs. 8 to 12, inclusive. Each carrier consists of an elongated sleeve 8 which is forked, as at 9, at the upper end and terminates in a plate 10. This plate is riveted, or otherwise secured, in an extension lug 11 formed on the chain 3. Extending through the sleeve 8 is a shaft 12, the upper end of which extends between the arms of the fork 9. On the extended end is secured a collar 13 whereby the shaft is held against endwise removal. Secured to one side of the sleeve and extending at right angles therefrom is a shaft 14 and journaled thereon is a flanged roller 15 which travels along the rail 2. Secured on the lower end of the shaft 12 is a gear 16 and secured to the lower face of the gear is a pair of arms 17 which carry a plate 18. This plate, see Fig. 12, has a pair of notches 19 formed therein to receive the legs of a chicken, or the like, to be treated.

Pivoted on the plate is a pair of clamping members 20 and 21. Both members are pivotally mounted on pins 22 secured to the plate and both members are provided with crank arms 23, each of which carries at the outer end a pin 24. These pins extend downwardly through arcuate slots 25 formed in the plate and the pins are linked together by a rod 26 so that both members will operate in unison, as will hereinafter be described. The member 20 is provided with a hand lever 27 and each member is provided with a clamping arm 28 and an ejecting arm 29. The member 21 has a link or push rod 30 attached thereto. This rod passes through a pivoted lug 31 and a spring 36 is interposed between said lug and the pivotal connection 30.

By referring to Fig. 12 it will be noted that a center line drawn through the pivot 22 of the member 21 and the pivoted lug 31 will be disposed at one side of the pivotal connection 30 when the clamping fingers 28 assume clamping position, and that the pivot 30 will assume a position on the opposite side of the center line when lever 27 is swung in the opposite direction. Plainly speaking, the clamping members are actuated by the spring 36 to assume either a clamping position or an ejecting position with relation to the notches 22 but their position depends upon manual operation of the lever 27.

The chickens, or other poultry to be treated, are delivered by operators to the conveyor at the point indicated at E, the chickens being grasped by the feet and the feet being placed in the notches 19. The hand lever 27 is then grasped and swung in a counter-clockwise direction, see Fig. 12, and the clamping fingers 28 will move into engagement with the legs of the chicken and will there secure them. The chickens will thus hang suspended from the chain or conveyor and will move with it in the direction of arrow b, see Fig. 1. The next operation on the part of the operator is to secure the head of the chicken by means of a clamping member which is best illustrated in Figs. 1, 7 and 13.

The clamping members are generally indicated at F. They are carried by a secondary conveyor chain indicated at G. The clamping members are arranged at spaced intervals, said spaced intervals being the same as the spacing of the carriers D. The clamping members F comprise a plate 37 secured to the chain on conveyor G. This plate terminates in a plate 38 which is semi-circular in cross section and which has a notch 39 formed centrally thereof. The forward end of the plate 38 has a bearing lug 40 formed thereon and pivoted therein is a clamping plate 41, which is manually raised against a spring 42, and it is also provided with an extension lever 43 having a roller 44 on its outer end which is engageable with cam tracks 45 and 45a, the purpose of which will hereinafter be described.

Secured to the main frame above the path of travel of the conveyor G and the clamping members F carried thereby is an insulating member 46 on which is pivotally mounted a contact arm 47. This arm is connected through a wire 48 with one side of a source of electric current supply, the other source of current supply being connected or grounded to the frame. Journaled in the frame below the line of travel of the clamping members F is a shaft 50, on the outer end of which is secured a circular cutting knife 51, said knife being disposed in alignment with the notches 39 formed in the plates 38. The knife is driven at a suitable speed and the main conveyor and the secondary conveyor are driven in unison; the driving connections being best shown in Fig. 1.

In this view, 53 indicates an electric motor supported on top of the main frame. This motor drives a shaft 54 extending longitudinally of the frame B through means of a belt 55. The shaft 54 through a reduction gear drive indicated at 56 drives a shaft 57 extending longitudinally of the frame C, and shaft 57 drives the driving sprocket 7 of the main conveyor through a set of bevel gears indicated at 58. The secondary conveyor G is carried by sprockets at opposite ends secured on shafts 59 and 60, the shaft 59 being in turn driven from the shaft 57 by a sprocket chain 61. The shaft 50 to which the circular knife is secured is journaled crosswise of the frame B and is driven from shaft 54 through a belt drive generally indicated at 63, see Figs. 1 and 7. From the drive disclosed it will be apparent that the main and the secondary conveyor will be driven in unison and at the same speed and it will also be apparent that the circular knife is continuously rotated and at a high speed.

The several operations performed are as follows: First the chickens, or other poultry to be treated, are suspended from the main conveyor; secondly, their heads are clamped in the clamping members carried by the secondary conveyor, and while both conveyors travel in unison the poultry are first electrically stunned, their throats are then cut by the knife 51 and they are then given time to thoroughly bleed; thereafter the clamp securing the heads of the poultry are automatically released and the poultry are then delivered into a steaming chamber; and thereafter removed from the main conveyor and placed on a picking table and are there plucked.

The steaming chamber will now be described. The steaming chamber is carried by the shaft C of the main frame. It is completely enclosed, top, bottom and sides, by plates or other suitable means and extends from the point indicated at 70 to the point indicated at 71. The end indicated at 70 carries a vertical shaft 72 upon which is secured a gate member consisting of four vertically extending plates, such as shown at 73 see Fig. 6. The upper end of the shaft carries a sprocket gear 74 which is engaged on opposite sides by the main conveyor chain as clearly shown in Fig. 5. The plates 73 of the gate divide it into four compartments and as the gate is rotated by the main conveyor chain 3 it will rotate at the same speed and the plates are so arranged that the carriers D will register with the spaces intermediate the plates, hence when the machine is in operation and as the carrier reaches the steaming chamber it will register with one of the spaces in the gate formed between the plates 73 and the chicken or other poultry being treated will hang suspended from the chain in this space. Flexible flaps, such as shown at 78, are arranged at opposite sides of the gate and the steam chamber is thus retained closed while one chicken is being admitted and while another chicken is being removed on the opposite side.

Within the steaming chamber are arranged a plurality of pipes, such as shown at 77 in Figs. 3 and 4, an enlarged view of one of the pipes being shown in Fig. 14. There is a pipe 78l within each pipe 77. This pipe is connected with a source of air supply under pressure and a plurality of nozzles 79 are secured to the pipe 78l which register with perforations 80, formed in the pipe 77. The pipe 77 is supplied with steam or hot water from a suitable source through means of pipes 81. The pipes 79 and the perforations 80 form the nozzles and the nozzles are disposed as shown in Fig. 4, so that warm air and steam will be directed against the chickens suspended from the conveyor at angles which tend to spread and open the feathers so as to admit the steam or heating medium employed directly to the feather follicles so as to release and soften them as much as possible.

Within the steam chambers and below the tracks are pin racks 83, see Figs. 9 and 10. These pin racks engage the gears 16 on the respective carriers and they are thus continuously rotated while passing through the steaming chamber, thus revolving the chickens as they pass by the nozzles thereby causing uniform penetration of feathers. The means for supplying the nozzles with warm air and steam or hot water may be of the type disclosed in our copending application, or any other suitable means. 100 is a steam boiler connected by means of the pipe 81 with the pipe 77 for the purpose of supplying steam. 101 is an air compressor connected by means of the pipe 102 to the pipe 781 to supply compressed air. 103 is a stove for heating this compressed air. For instance, the heated air may come from one source of supply and the hot water and steam from another, etc.

In actual operation the poultry to be treated are first hung in the suspended condition from the main conveyor by attaching their feet in spaced apart relation, one chicken to each clamping plate 18 of the respective carriers D, as previously described. The heads are then attached to the clamping members F of the secondary conveyor G by manually raising the clamping arms 41 and placing the heads on the plates 38. The arms 41, when released, will engage the tops of the heads, or in other words the combs and will make a good electric contact therewith. After the heads have been clamped in position and as the conveyors advance in unison arm 41 will be engaged by the contact arm 47, an electric circuit will then be established and the poultry will be stunned. A moment thereafter the clamping member F will ride over the circular knives 51 and the throats of the poultry will be cut. A trough 91 extends from this point to the end of the secondary conveyor G and this is of sufficient length to permit thorough bleeding of the poultry. At the time the clamp F comes into alignment with the circular knife 51 the roller 44 engages the cam 45 and the clamping end of the arm 41 is slightly raised if empty so as to avoid any danger of being engaged by the circular knife. When the poultry is thoroughly bled the clamp will reach the opposite end of the secondary conveyor and it will engage the cam track 45a, that is the roller 44 is engaged thereby and the clamping arm 41 is lifted entirely free of the head, thus releasing it and permitting the chicken to be entirely suspended from the carriers D. The chickens or poultry to be treated having now been electrically stunned, cut and bled are ready for admission to the steaming chamber. They will enter one by one through the gate carried by the shaft 72 and as they enter the steaming chamber the gears on the carriers will engage the pin racks 83 and the carriers with the chickens suspended therefrom will be slowly rotated and as the nozzles direct the heated fluid downwardly against the feathers it will tend to blow or spread them apart and the heated fluid will be admitted a a point where the feather follicles can be most efficiently treated, released and softened. After passing through the steaming chamber they will again emerge through the gate and pass around the idler sprockets 6. In front of the machine is arranged a long table 94 where a series of operators are positioned. Each operator will merely reach up and release the clamping levers whereby the feet are secured and they are then placed on the table and plucked and as the carriers round the sprocket 4 and reach the position E, they will again be loaded. The operation is thus continuous and automatic.

From the foregoing it will be noted that the fowl is suspended by the feet and head, the head resting in an adequate clamping device carried by the secondary conveyor; the two conveyors moving in unison and carrying the poultry from one station of operation to another. The clamping device for the head acts as an electrode through which a high frequency current is passed. Contact is made at a given time and sufficient amperage and voltage is released which instantly and completely paralyzes the fowl. Paralysis is evidenced by a sudden contraction of all muscles and this refers to the fact that the sensory and motor nerves are rendered inactive, the contraction being the normal result of the current stimulus. The fowl next passes the rotating knife which severs the throat and opens the larger vessels of the neck. Blood, air, and other fluids escape into the drain trough. In operation it is noted that the heart is independent of the brain for its mechanical and chemical stimulae and, therefore, continues to beat even after the electrical shock is administered and after the throat is cut. The blood under the force of the heart continues to pump the same and at this time drains and exits through the severed vessels, and it is only after the blood is pumped out that the heart muscle ceases its rhythmic beating. Of course, when the vagus nerve is cut, there is a momentary reflex noted, which causes some spasmodic flutter of the fowls' eyelids and undoubtedly this stimulates an after surge which assists in further drainage of the heart.

During the next phase of the processing the cutaneous tissues, as well as the feather follicles, are subjected to a very directional flow of heated water vapor and air, the purpose of the air being to lift and spread the feathers apart so that the low temperature steam may penetrate to the skin and cause a relaxing through the heat applied of the feather follicles; this process being of sufficient duration to thoroughly render the feather follicles relaxed and softened, and thus, the plucking of the feathers is accomplished quickly and with ease.

A noteworthy consideration is the humane manner in which the fowl is handled, as the bird experiences no pain during any stage of the process. All sensory transmission of nerve is stopped upon the application of the electricity. The clamping devices are comfortable and support the head in proper apposition to the knife in such a manner that each fowl is processed in a like manner.

The complete drainage of blood due no doubt to the electrical impulse causing the contraction of the peripheral vessels, but not of such potential as to cause the heart to cease beating, causes the larger and deeper blood vessels to contract and expand by muscular tissue. The surge of current likewise causes the larger vessels to contract and thus aid in the drainage. In fact, it has been observed that not only the blood drains but, as well, any fluid matter which may escape from the esophagus, and thus fluids of the stomach are emptied.

Absence of mechanical and thermal trauma to the tissues is very noteworthy. There are some processes in practice where the fowl is dipped into hot wax and hot water and then forcefully cooled by cold air blasts. This process favors a quicker disintegration of the subcutaneous tissue and with the quick formation of iron porphyrin degeneration products, which is noted by a green and bluish color appearing under the skin. It is evident that in the absence of such above severe treatment that the fowl thus processed by the present method will retain their normal color for a much longer period. A second factor, and one which is in favor of a better flavor of the meat, refers to the fact that during thermal trauma and subsequent cooling the natural process of rigor mortis is interfered with and thus the meat is liable to be more tough and likely to lose its delicate flavor. In the present steaming process no severe trauma occurs and thus the best is brought forth from the standpoint of tissue maintenance; also all operations are as sanitarily conducted as is humanly possible.

Having thus described our invention, what we claim and desire to secure by Letters Patent is:—

1. In a machine of the character described a conveyor to which birds are secured, a housing through which the conveyor passes, means for projecting a mixture of air and a heated fluid medium against and under the feathers of the birds while passing through the housing, and means for imparting a rotational movement to the birds.

2. In a machine of the character described a conveyor, a plurality of carriers on the conveyor, means for attaching a bird to each carrier, a housing through which the conveyor passes, means for rotating the carriers to which the birds are secured while passing through the housing, and a series of nozzles in the housing for projecting a mixture of air and a heated fluid medium against and under the feathers of the birds while the carriers and birds are rotating.

3. In a machine of the character described a conveyor, a plurality of carriers on the conveyor, means for attaching a bird to each carrier, a gear on each carrier, a gear rack within the housing with which the carrier gears engage and whereby they are rotated while passing through the housing, and a series of nozzles in the housing for projecting a mixture of air and a heated fluid medium against and under the feathers of the birds while the carriers and birds are rotating.

4. In a machine of the character described a conveyor to which birds are secured, a housing through which the conveyor passes, and means for projecting a mixture of steam and air against and under the feathers of the birds while passing through the housing.

5. In a machine of the character described a conveyor to which birds are secured, a housing through which the conveyor passes, a plurality of nozzles disposed on opposite sides of the conveyor, and means for delivering a mixture of steam and heated air to the nozzles to be projected against and under the feathers of the birds while passing through the housing.

6. In a machine of the character described a conveyor to which birds are secured, a housing through which the conveyor passes, and means for projecting a mixture of air and a heated liquid medium against and under the feathers of the birds while passing through the housing.

PAUL ONORATO.
EMILE WEINAUG.